(12) United States Patent
Kuo et al.

(10) Patent No.: US 7,028,315 B2
(45) Date of Patent: Apr. 11, 2006

(54) OPTICAL DISK PLAYER WITH MODULARIZED DECELERATION DEVICE

(75) Inventors: Tsung-Jung Kuo, Kaohsiung (TW); Cheng-Fu Lee, Hsinchu (TW)

(73) Assignee: Lite-on IT Corp., (TW)

( * ) Notice: Subject to any disclaimer, the term of this patent is extended or adjusted under 35 U.S.C. 154(b) by 220 days.

(21) Appl. No.: 10/714,273

(22) Filed: Nov. 14, 2003

(65) Prior Publication Data

US 2004/0103419 A1 May 27, 2004

(30) Foreign Application Priority Data

Nov. 22, 2002 (TW) .............................. 91218910 U

(51) Int. Cl.
*G11B 17/04* (2006.01)
(52) U.S. Cl. ..................................... 720/619
(58) Field of Classification Search ................ 720/619, 720/600, 601, 615, 632, 602, 607, 635, 637, 720/664; 369/192.1, 30.85, 75.11, 75.21, 369/77.11, 77.21
See application file for complete search history.

(56) References Cited

U.S. PATENT DOCUMENTS

| | | | | |
|---|---|---|---|---|
| 5,434,839 A | * | 7/1995 | Choi | 720/607 |
| 6,052,342 A | * | 4/2000 | Yoshimura | 369/30.85 |
| 6,058,096 A | * | 5/2000 | Fujita et al. | 369/30.85 |
| 6,385,155 B1 | * | 5/2002 | Ichikawa et al. | 720/641 |
| 6,584,063 B1 | * | 6/2003 | Nagasaka et al. | 720/607 |
| 6,782,543 B1 | * | 8/2004 | Ahn | 720/601 |
| 6,832,382 B1 | * | 12/2004 | Ito et al. | 720/619 |
| 2003/0090984 A1 | * | 5/2003 | Lee et al. | 369/77.1 |

* cited by examiner

*Primary Examiner*—Allen Cao
(74) *Attorney, Agent, or Firm*—Raymond Sun

(57) ABSTRACT

An optical disk player has a carrier having an accomodation space provided along a side edge thereof, and a modular deceleration device that is coupled to the accomodation space. The deceleration device has a module case body that is formed in one piece, and a plurality of gears, all of which are attached to the module case body.

9 Claims, 7 Drawing Sheets

US 7,028,315 B2

OPTICAL DISK PLAYER WITH MODULARIZED DECELERATION DEVICE

BACKGROUND OF THE INVENTION

1. Field of the Invention

The present invention relates to an optical disk player having a modularized deceleration device. In particular, the present invention provides a deceleration device for decelerating the motor in a suction-type optical disk player, where the deceleration device is formed as a single module.

2. Description of the Prior Art

An optical disk player is a device for optically reading the data stored on an optical disk. The optical disk player can be connected to a computer with a signal cable to transfer data to the computer or audio output equipment. All optical disk players require a group of deceleration devices that include multiple gears, whose purpose is to output the power generated by a motor to a disk loading mechanism to load or unload an optical disk, and to a clamping mechanism to clamp the optical disk so that the optical disk can rotate stably on the turntable. Specifically, in a suction-type optical disk player, since saving space is an important design consideration, the design of the deceleration device can be critical and more complicated.

The conventional deceleration device for a conventional suction-type optical disk player is arranged in a distributed manner on the carrier. The conventional deceleration device has a set of main gears that drive a threaded rod, which in turn drives a set of spur gears. The spur gears drive a roller to further drive the disk loading mechanism. The head of the threaded rod also drives a secondary gear set, which in turn drives a gear rack to further drive the clamping mechanism. A carrying case body houses a motor, and the main gear set and the secondary gear set are installed in the carrying case body. On the other hand, the spur gears are arranged on the carrier.

Thus, as described above, the conventional deceleration device that is used with a suction-type optical disk player is assembled from many different parts which are connected to different parts. Therefore, the manufacturing and assembly are time-consuming and cost-intensive. It is also difficult to disassemble the deceleration device for maintenance purposes. In addition, such a deceleration device occupies a relatively large space. Therefore, there is a need to address these shortcomings.

SUMMARY OF THE INVENTION

It is an objective of the present invention to provide an optical disk player that is equipped with a modularized deceleration device. The gears of the deceleration device are formed as a single module; that is, all of the gears are incorporated in a module case body, which is installed on the optical disk player.

It is another objective of the present invention to provide an effective connection device to facilitate assembly and maintenance in order to lower the manufacturing cost and to conserve the limited internal space of the optical disk player.

In order to realize the objectives of the present invention, there is provided an optical disk player having a carrier having an accomodation space provided along a side edge thereof, and a modular deceleration device that is coupled to the accomodation space. The deceleration device has a module case body that is formed in one piece, and a plurality of gears, all of which are attached to the module case body.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
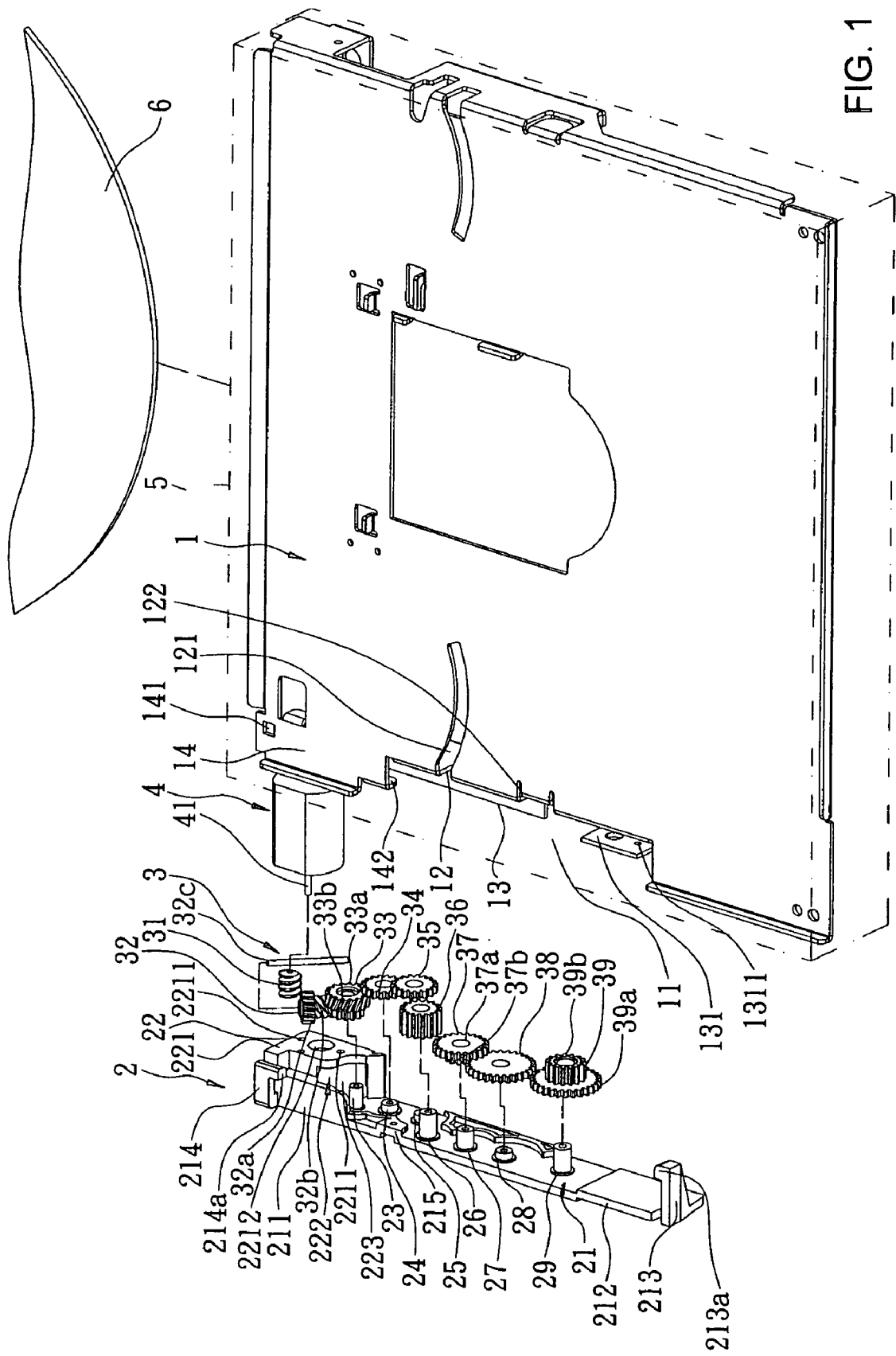
FIG. 1 is an exploded perspective view of an optical disk player incorporating a modularized deceleration device according to one embodiment of the present invention.

FIG. 1 is an exploded perspective view of an optical disk player according to the present invention and its modularized deceleration device. The optical disk player includes a carrier 1 and a deceleration device, both of which are arranged inside an outer case 5. The deceleration device includes a module case body 2 connected to the carrier 1, and a gear set 3 that is installed on the module case body 2. A motor 4 is coupled to the module case body 2 to drive the gear set 3. The motor 4 has a shaft 41 that defines an axial center.

The module case body 2 has an inner-facing carrying surface 21 located in its middle part, a gearbox 22 connected to one end of the module case body 2, and an assembly part 212 provided on the other side of the module case body 2 and projecting slightly towards the carrier 1. The gearbox 22 has a coupling surface 221, a chamber 222 formed inside, and a side opening 223 facing sideways to the carrying surface 21 (i.e., perpendicular to the carrying surface 21). The coupling surface 221 has a pair of screw holes 2211 that allow the motor 4 to be attached to the coupling surface 221 by screws (not shown). The coupling surface 221 also has an axial center through-hole 2212 through which the shaft 41 of the motor 4 and the worm 31 can be inserted for accommodation inside the chamber 222.

Figure 2:
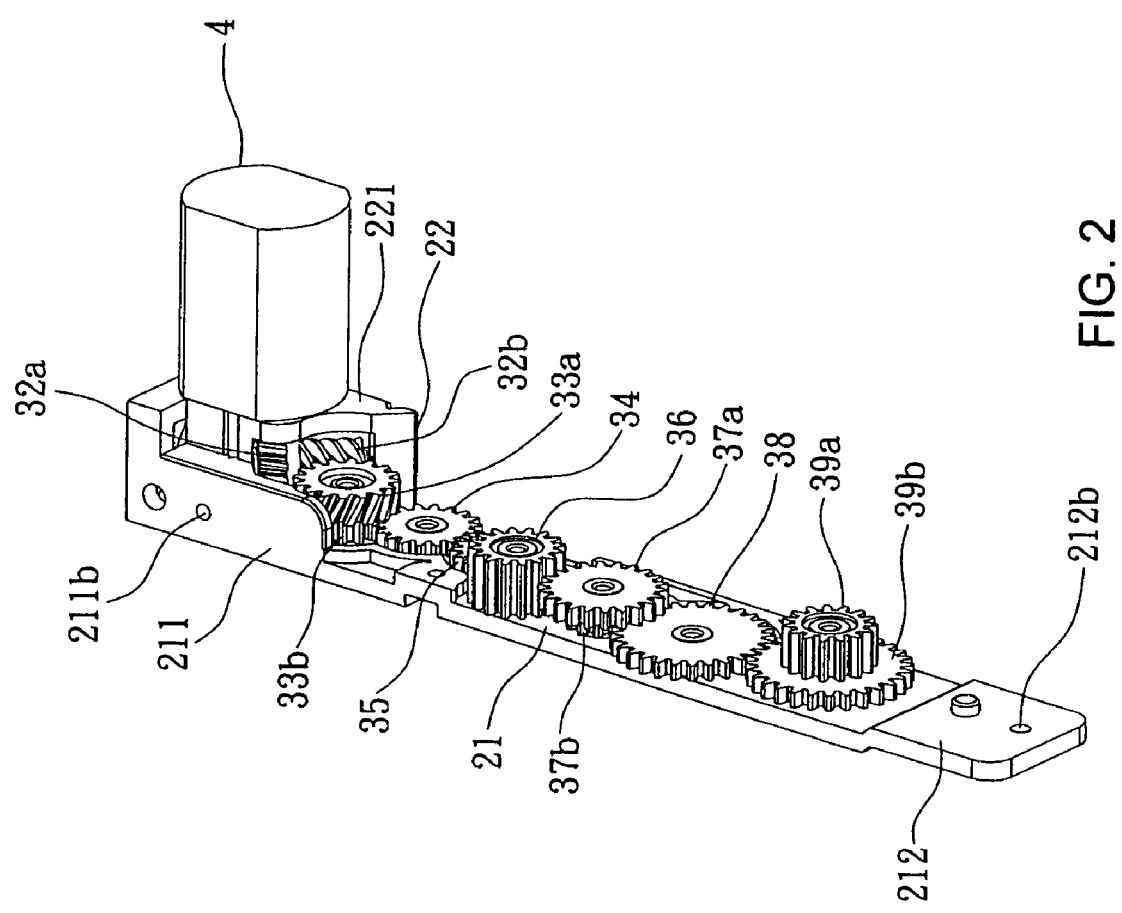
FIG. 2 is a perspective view of the modularized deceleration device of FIG. 1.

FIG. 2 illustrates the assembly of the deceleration device of FIG. 2. Referring to FIGS. 1 and 2, the gear set 3 includes a first composite gear 32 that is positioned at the opening 223 of the gearbox 22, and which is perpendicular to the shaft 41 of the motor 4 and forms an angle of about 45 degrees with respect to the surface of the carrier 1 (see also FIG. 7B). The gear set 3 also includes a second composite gear 33 that engages the first composite gear 32, a first spur gear 34 that engages the second composite gear 33, a second spur gear 35 that engages the first spur gear 34, a third spur gear 36 that engages the second spur gear 35, a third composite gear 37 that engages the third spur gear 36, a fourth spur gear 38 that engages the third composite gear 37, and a fourth composite gear 39 that engages the fourth spur gear 38. These gears 33-39 are installed on a second composite gear shaft 23, a first spur gear shaft 24, a second spur gear shaft 25, a third spur gear shaft 26, a third composite gear shaft 27, a fourth spur gear shaft 28, and a fourth composite gear shaft 29, respectively. All of these shafts 23-29 project inwardly towards the carrier 1 from the carrying surface 21.

The first composite gear 32 is comprised of a worm wheel 32a and a worm 32b, which are fitted on a ratchet 32c and are connected to the opening 223 of the gearbox 22 via the ratchet 32c. The diameter of the worm wheel 32a is larger than the diameter of the worm 32b. The worm wheel 32a engages the worm 31 on the shaft 41 of the motor 4. Thus, the worm 31 drives the gear set 3.

The second composite gear 33 is comprised of a relatively large helical gear 33a and a relatively small spur gear 33b. The helical gear 33a engages the worm 32b of the first composite gear 32. The spur gear 33b engages the first spur gear 34.

The third composite gear 37 is comprised of a large spur gear 37a and a small spur gear 37b. The large spur gear 37a engages the third spur gear 36, while small spur gear 37b engages the fourth spur gear 38.

The fourth composite gear 39 is comprised of a large spur gear 39b and a small spur gear 39a. The large spur gear 39b engages the fourth spur gear 38.

Figure 3A:
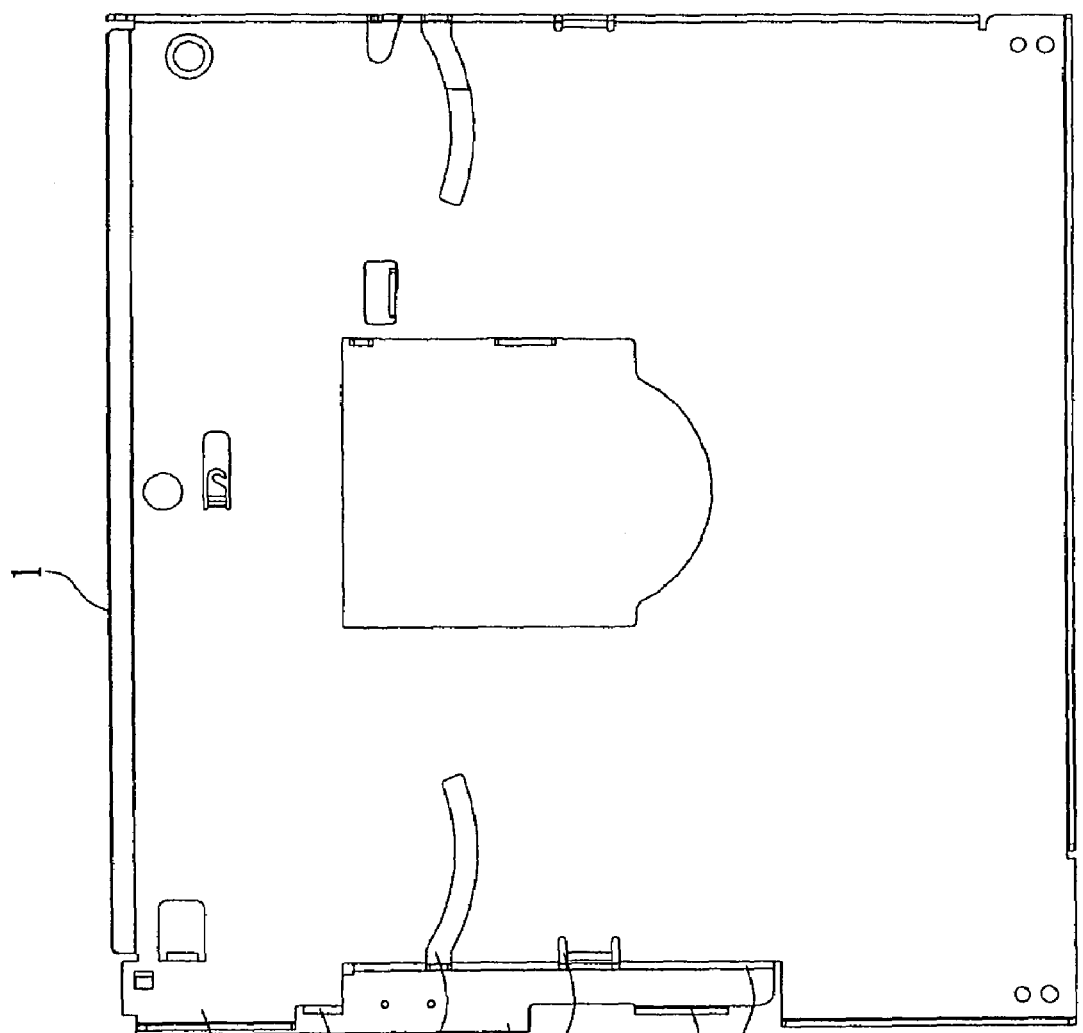
FIG. 3A is a top plan view of the carrier of the optical disk player of FIG. 1.
Figure 3B:
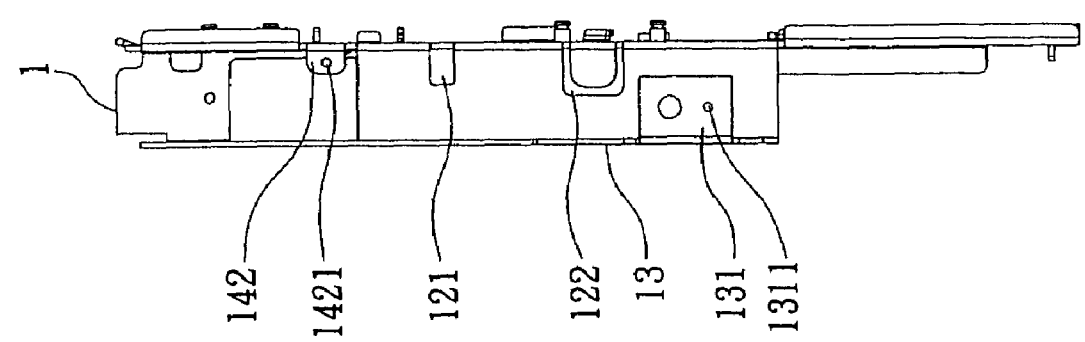
FIG. 3B is a side plan view of the carrier of the optical disk player of FIG. 1.
Figure 4:
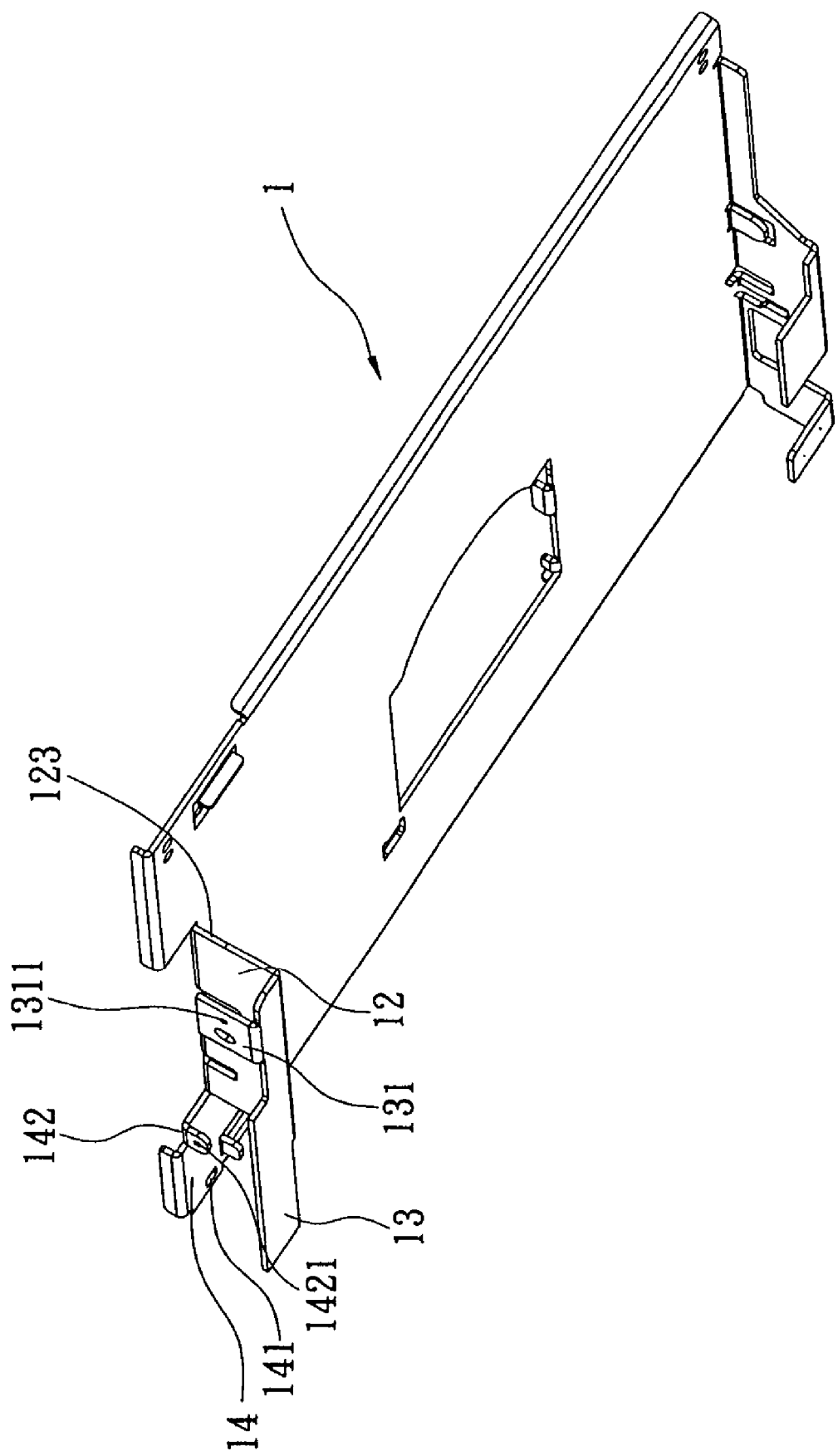
FIG. 4 is a perspective view of the carrier of the optical disk player of FIG. 1.
Figure 5:
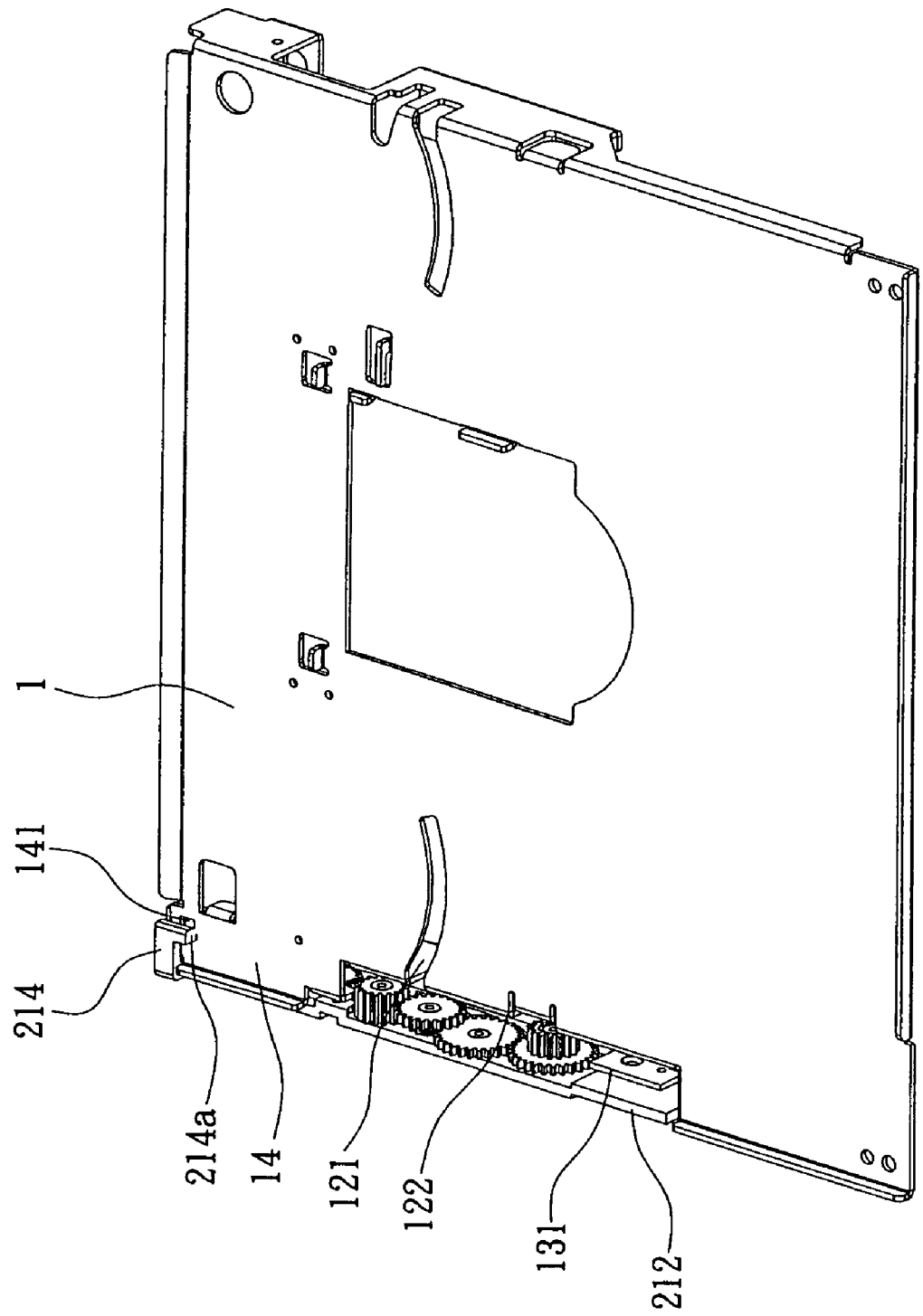
FIG. 5 is a perspective view illustrating the assembly of the deceleration device to the accomodation space in the carrier of FIG. 1.
Figures 7A, 7B:
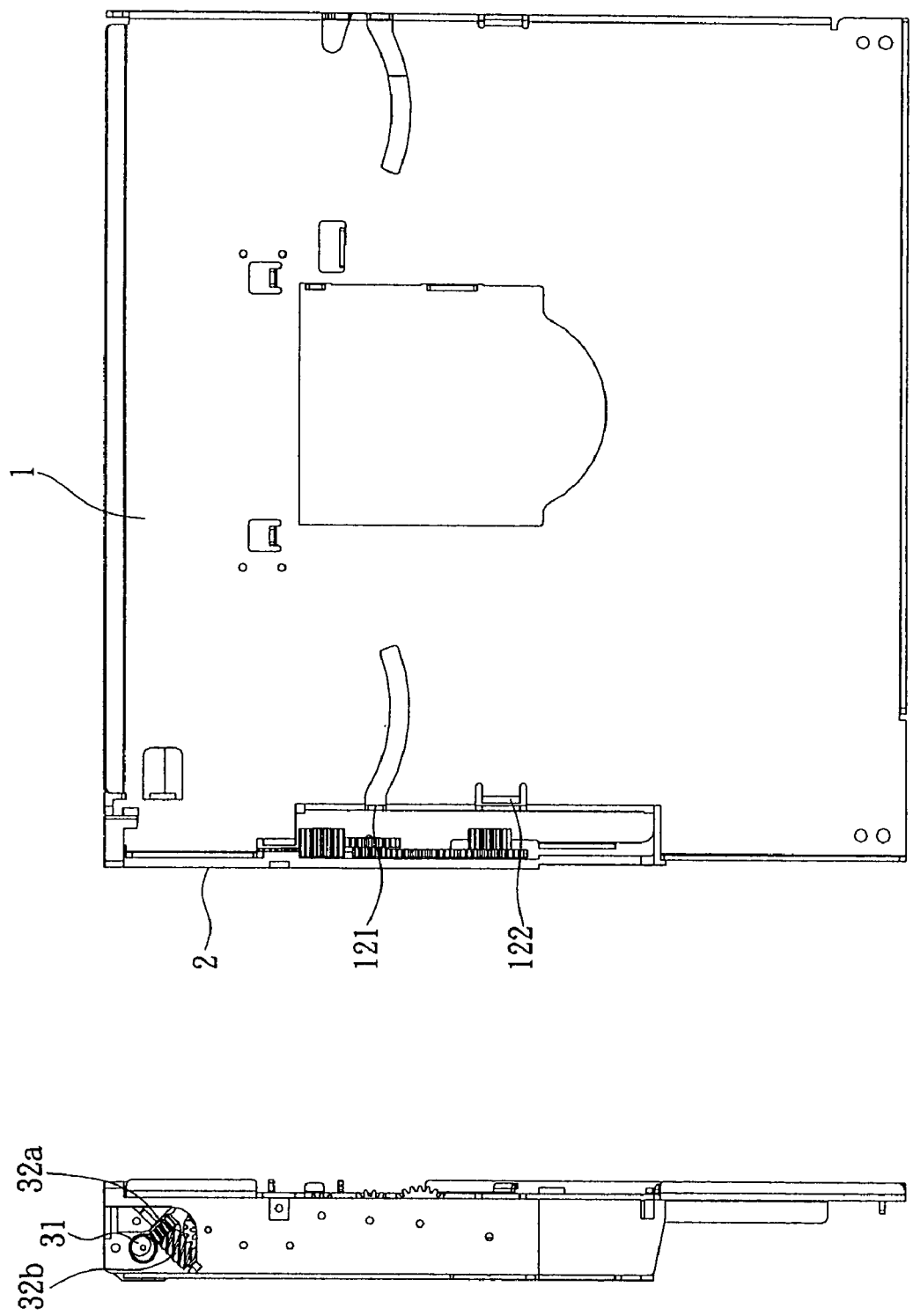
FIG. 7A is a top plan view of the modularized deceleration device of FIG. 6.
FIG. 7B is a side plan view of the modularized deceleration device of FIG. 6.

As best shown in FIG. 1, the carrier 1 has an accommodation space 11 provided along a side edge for receiving the gear set 3. Referring also to FIGS. 2-4, the accommodation space 11 has a vertical plate 12 which extends vertically and downwardly from the edge of the carrier 1 at the accommodation space 11, and a bottom plate 13 that extends perpendicular to the vertical plate 12. Referring also to FIGS. 3A, 5 and 7A, a first power output hole 121 is provided on the carrier 1, and a second power output hole 122 is provided at the vertical plate 12 and the carrier 1 for the clamping device on the vertical plate 12. The position of the first power output hole 121 corresponds to the location of the third spur gear 36 in order to allow power to be output to the disk loading device (not shown in the drawings) to load or unload an optical disk 6. The position of the second power output hole 122 for the clamping device corresponds to the location of the small spur gear 39b of the fourth composite gear 39 in order to allow power to be output to the clamping device (not shown in the drawings) to clamp the loaded optical disk 6. Details of the carrier 1 are best illustrated by FIG. 3A, which is a top view of carrier 1, and FIG. 3B, which is a side view of the carrier 1.

FIG. 4 provides a perspective view of the carrier 1 as seen from another angle, to better illustrate the accomodation space 11. A vertical assembly surface 131 extends from the bottom plate 13, and is adapted to be positioned adjacent to the assembly part 212 of the module case body 2. The other end of the accommodation space 11 that is opposite to the vertical assembly surface 131 is formed as a horizontal assembly surface 14. Referring back to FIG. 1, the assembly part 212 of the module case body 2 has a horizontal arm 213 that extends perpendicular to the assembly part 212. The arm 213 has a hook 213a that is adapted to be hooked to the hooking location 123 on the corresponding edge of the vertical plate 12. A horizontal assembly surface 211 extends perpendicularly from the carrying surface 21 vertically above one end of the gearbox 22 (see FIG. 2), and is adjacent to the horizontal assembly surface 14 of the carrier 1. The horizontal assembly surface 211 has a horizontal arm 214 that has a hook 214a (see FIG. 5) which is adapted to be hooked to a corresponding hook hole 141 on the horizontal assembly surface 14 of the carrier 1. In this way, the deceleration device 2 can be assembled on to the carrier 1 quickly and conveniently by hooking the two hooks 213a and 214a to the hooking location 123 and the hook hole 141, respectively. FIG. 5 illustrates the deceleration device 2 coupled to the accomodation space 11 via the hooks 213a and 214a.

Figure 6:
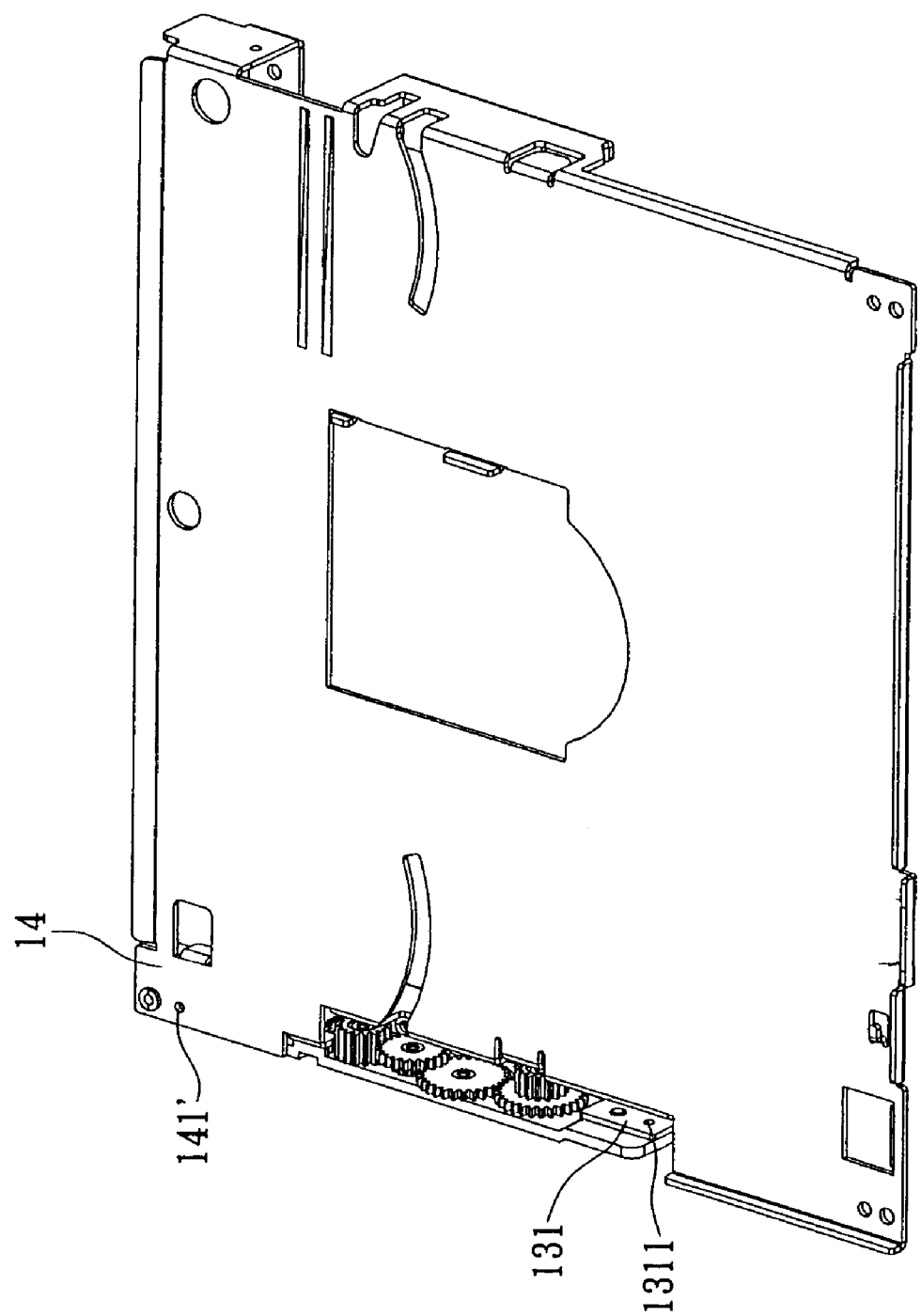
FIG. 6 is a perspective view of a modularized deceleration device and carrier illustrating a different way of securing the deceleration device to the carrier according to the present invention.

FIGS. 6, 7A and 7B illustrate another method of securing the deceleration device 2 to the carrier 1 according to the present invention. Here, the deceleration device 2 can be screwed onto the carrier 1. A screw hole 141' is provided on the horizontal assembly surface 14 of the carrier 1, and a screw hole 1311 is formed on the vertical assembly surface 131 (see also FIG. 4). As shown in FIG. 2, a screw hole 211b can be formed on the horizontal assembly surface 211 of the module case body 2 and aligned with corresponding screw hole 141', so that a screw (not shown) can be used to secure the horizontal assembly surfaces 14 and 211 of the carrier 1 and the module case body 2, respectively. Similarly, a screw hole 212b can be formed on the assembly part 212 of the module case body 2 and aligned with corresponding screw hole 1311, so that a screw (not shown) can be used to secure the assembly part 212 and the vertical assembly surface 131.

As shown in FIGS. 3A, 3B and 4, a screw connecting surface 142 extends downwardly from the horizontal assembly surface 14 of the carrier 1 at a location adjacent to the accommodation space 11, and a screw hole 1421 can be formed on the screw connecting surface 142. As shown in FIG. 1, a protrusion part 215 is formed on the carrying surface 21 of the module case body 2 at a location near the gearbox 22. A screw hole can be formed on the protrusion part 215 and aligned with corresponding screw hole 1421 on the screw connecting surface 142, so that a screw (not shown) can be used to secure the protrusion part 215 to the screw connecting surface 142. Thus, screws can also be used to connect the deceleration device of the present invention to the carrier 1, as shown in FIGS. 6, 7A and 7B.

Thus, the present invention provides the following advantages. First, the deceleration device 2 is formed in a single module, which reduces the manufacturing costs. Second, the quick-hooking mechanisms make it possible to assemble the deceleration device very quickly and conveniently. Third, the gears are modularized to allow the limited internal space of the suction-type optical disk player to be minimized.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:
1. An optical disk player, comprising:
a carrier having a side edge and an accomodation space provided along the side edge; and
a deceleration device that is coupled to the accomodation space, the deceleration device comprising:
a module case body that is formed in one piece;
a gearbox that is permanently connected to the module case body; and
a plurality of gears, all of which are permanently attached to the module case body;

wherein the plurality of gears, the gearbox and the module case body are formed in one piece.

2. The optical disk player of claim 1, further including a motor coupled to the module case body.

3. The optical disk player of claim 1, wherein the carrier has a vertical plate positioned in the accomodation space, and a bottom plate extending perpendicularly from the vertical plate.

4. The optical disk player of claim 1, further including means for hooking the module case body to the carrier.

5. The optical disk player of claim 1, further including means for removably coupling the module case body to the carrier.

6. The optical disk player of claim 3, wherein the module case body is coupled to the vertical plate.

7. An optical disk player, comprising:
a carrier having a side edge and an accomodation space provided along the side edge; and
a deceleration device that is coupled to the accomodation space, the deceleration, device comprising:
   a module case body that is formed in one piece;
   a gearbox that is permanently connected to the module case body; and
   a plurality of gears, all of which are permanently attached to the module case body;
wherein the gearbox has a chamber formed inside, and a side opening facing sideways to the module case body, with one of the plurality of gears retained inside the chamber.

8. The optical disk player of claim 7, further including a motor coupled to the gearbox.

9. An optical disk player, comprising:
a carrier having a side edge and an accomodation space provided along the side edge; and
a deceleration device that is coupled to the accomodation space, the deceleration device comprising:
a module case body that is formed in one piece; and
a plurality of gears, all of which are permanently attached to the module case body, wherein the plurality of gears includes a first composite gear, a second composite gear that engages the first composite gear, a first spur gear that engages the second composite gear, a second spur gear that engages the first spur gear, a third spur gear that engages the second spur gear, a third composite gear that engages the third spur gear, a fourth spur gear that engages the third composite gear, and a fourth composite gear that engages the fourth spur gear.

* * * * *